United States Patent
Kamioka et al.

(10) Patent No.: US 8,702,144 B2
(45) Date of Patent: Apr. 22, 2014

(54) VEHICLE INSTRUMENT PANEL STRUCTURE

(75) Inventors: Toshikazu Kamioka, Saitama (JP); Nam Seok Kang, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 13/501,886

(22) PCT Filed: Oct. 5, 2010

(86) PCT No.: PCT/JP2010/067417
§ 371 (c)(1),
(2), (4) Date: Apr. 13, 2012

(87) PCT Pub. No.: WO2011/046040
PCT Pub. Date: Apr. 21, 2011

(65) Prior Publication Data
US 2012/0200108 A1  Aug. 9, 2012

(30) Foreign Application Priority Data

Oct. 16, 2009 (JP) ................................ 2009-239013

(51) Int. Cl.
*B60R 7/06* (2006.01)
(52) U.S. Cl.
USPC ....................................................... 296/37.12
(58) Field of Classification Search
USPC ....................................................... 296/37.12
See application file for complete search history.

(56) References Cited

FOREIGN PATENT DOCUMENTS

| DE | 4204495 A1 | 8/1993 |
|----|----|----|
| JP | 58-073554 A | 5/1983 |
| JP | 63-101449 U | 7/1988 |
| JP | H01-62132 U | 4/1989 |
| JP | 9-175228 A | 7/1997 |
| JP | 11-291793 A | 10/1999 |
| JP | 2000-118547 A | 4/2000 |
| JP | 2002-293192 A | 10/2002 |
| JP | 2003-323872 A | 11/2003 |
| JP | 2004-131211 A | 4/2004 |
| JP | 2006-138076 A | 6/2006 |
| JP | 2009-096295 A | 5/2009 |

*Primary Examiner* — H Gutman
(74) *Attorney, Agent, or Firm* — Carrier Blackman & Associates, P.C.; Joseph P. Carrier; William D. Blackman

(57) ABSTRACT

There is provided a structure with which a lid can be easily removed from a vehicle instrument panel, and the lid hardly drops off. According to the present invention, a vehicle instrument panel structure having an opening portion (11) for maintenance of components disposed inside an instrument panel (10) for a vehicle and a lid (20) covering the opening portion (11) includes: a projection portion (23) projecting from an upper portion of the lid (20) to a rear surface side of a margin of the opening portion (11); and a protrusion portion (34) at which the projection portion (23) of the lid (20) stops by engagement in a state that a lower portion of the lid (20) is open on the rear surface side of the margin of the opening portion (11) of the instrument panel (10), wherein the protrusion portion is formed such that, when the lid (20) is moved downward in the state that the lower portion of the lid (20) is open, the projection portion (23) can move over the protrusion portion (34) that stops the projection portion (23) by engagement, and the lid (20) can be thereby removed from the instrument panel (10).

8 Claims, 6 Drawing Sheets

FIG.1
(a)
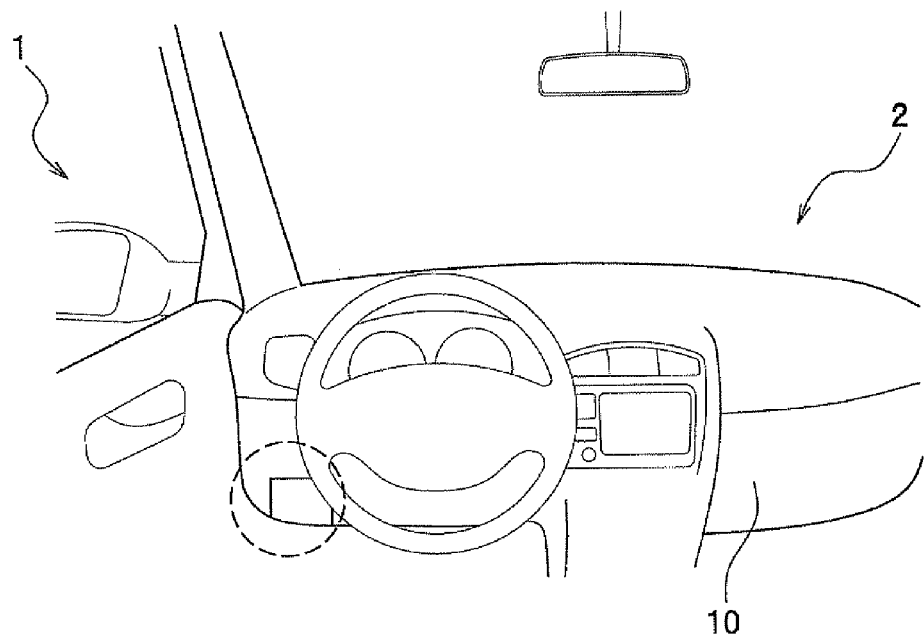
(b)
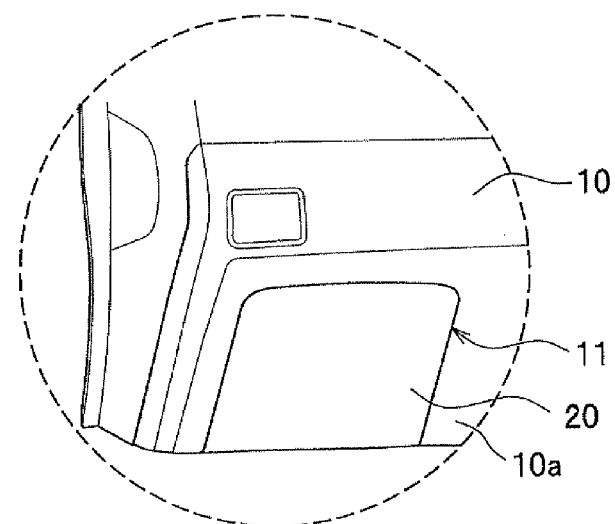

FIG.2
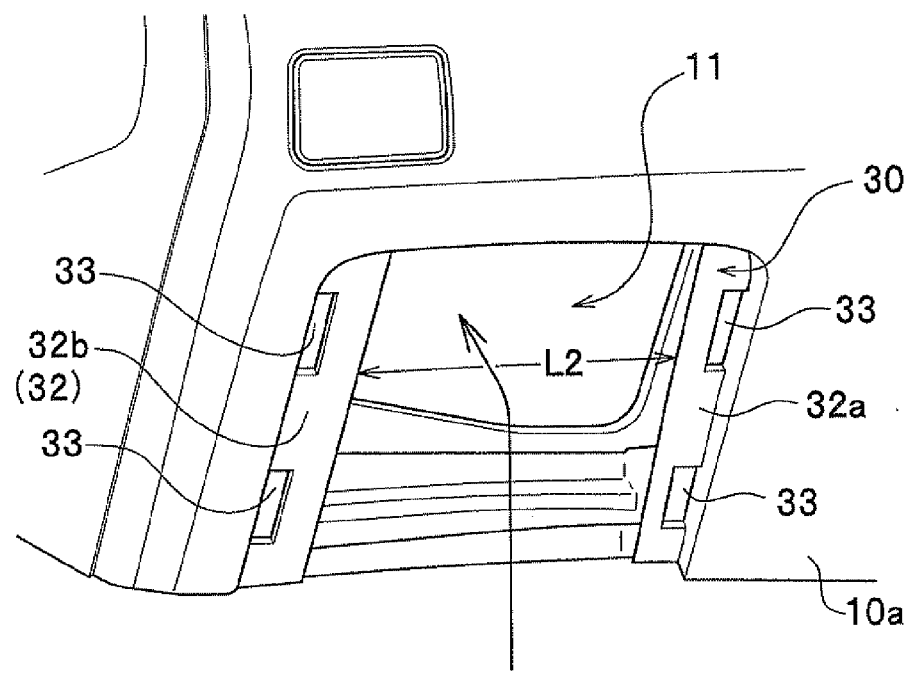
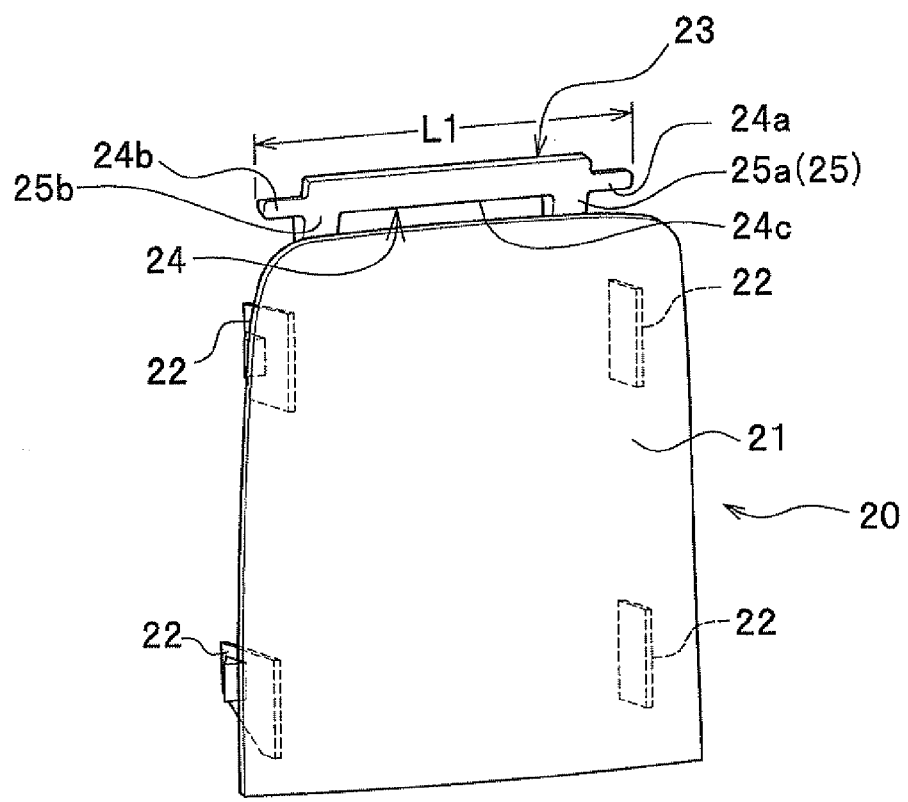

FIG.6
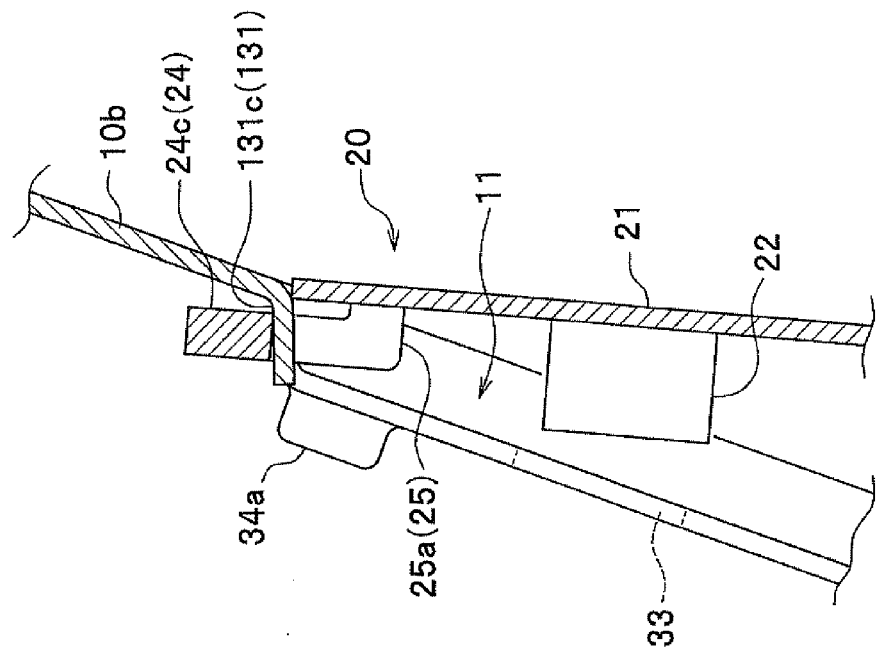
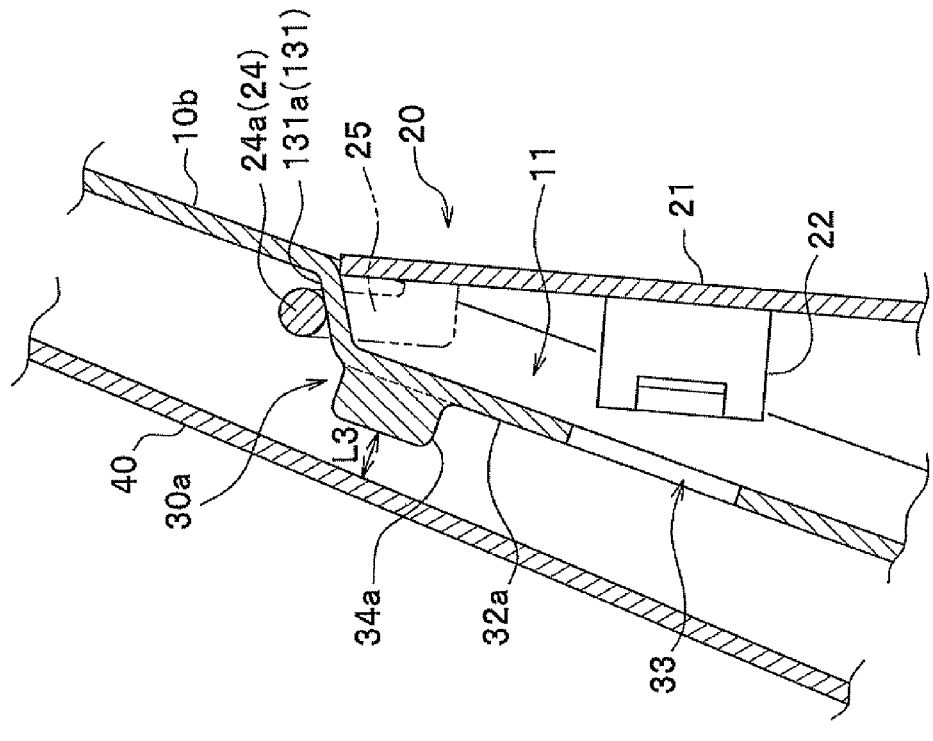

VEHICLE INSTRUMENT PANEL STRUCTURE

TECHNICAL FIELD

The present invention relates to a vehicle instrument panel structure, and particularly relates to a structure for prevention of drop-off of a lid removably provided on an instrument panel.

BACKGROUND ART

Conventionally, an instrument panel disposed anterior to a vehicle interior is provided with various instruments on the front side, and is provided with many components, such as a fuse, on the inside of the vehicle that is the rear surface side of the instrument panel.

Therefore, the instrument panel is provided with an opening portion for maintenance for replacement task on the fuse and the like arranged inside the vehicle, and is further provided with a lid for closing the opening portion for maintenance.

Further, from the viewpoint of easy maintenance, for easy replacement of a fuse and the like, the below-described Patent Document 1 discloses a lid removable from an instrument panel, wherein the instrument panel is provided with an engagement hole, and the lid is provided with an engagement nail.

BACKGROUND ART DOCUMENT

Patent Document

Patent Document 1: Japanese Unexamined Utility Model Application Publication No. S63-101449

DISCLOSURE OF THE INVENTION

Problems to be Solved by the Invention

Although, with the structure disclosed by above-described Patent Document 1, the lid can be easily removed, the lid may easily drop off from the instrument panel.

Particularly, in a case that the opening portion for maintenance is provided near a foot of a passenger, as it is highly possible that the passenger unintentionally kicks or contacts the lid, the lid may drop off from the instrument panel.

In this situation, the present invention has been developed, addressing the above-described problem, and an object of the invention is to provide a structure that enables easy removing a lid from an instrument panel and inhibits drop-off of the lid.

Means for Solving the Problem

In order to solve the above-described problem, according to the present invention, a vehicle instrument panel structure having an opening portion for maintenance of components disposed inside an instrument panel for a vehicle and a lid covering the opening portion includes: a projection portion projecting from an upper portion of the lid to a rear surface side of a margin of the opening portion; and a protrusion portion at which the projection portion of the lid stops by engagement in a state that a lower portion of the lid is open on the rear surface side of the margin of the opening portion of the instrument panel, wherein the protrusion portion is formed such that, when the lid is moved downward in the state that the lower portion of the lid is open, the projection portion can move over the protrusion portion that stops the projection portion by engagement, and the lid can be thereby removed from the instrument panel.

With the vehicle instrument panel structure according to the present invention, as the projection portion is formed on the lid, projecting to the rear surface side of the margin of the opening portion, the projection portion of the lid can be supported on the rear surface side of the instrument panel. Further, when the lid is open, the projection portion formed on the lid stops by engagement at the protrusion portion formed on the margin of the opening portion.

Accordingly, even when the lid is unintentionally kicked, as the projection portion of the lid stops by engagement at the protrusion portion, the lid cannot be separated from the instrument panel unless the projection portion of the lid moves over the protrusion portion. In such a manner, it does not occur that the lid easily separates from the instrument panel to drop off.

Further, regarding removing of the lid, first, the projection portion of the lid is stopped by engagement by the protrusion portion of the instrument panel, and by moving the lid further downward, the projection portion of the lid moves over the protrusion portion of the instrument panel and thereby the lid can be easily removed.

Further, according to the present invention, a vehicle instrument panel structure having an opening portion for maintenance of components disposed inside an instrument panel for a vehicle and a lid covering the opening portion includes: a projection portion projecting from an upper portion of the lid to a rear surface side of a margin of the opening portion; and a protrusion portion at which the projection portion of the lid stops by engagement when the lid is moved downward in a state that a lower portion of the lid is open on the rear surface side of the margin of the opening portion of the instrument panel, wherein the protrusion portion is formed such that, when the lid is moved downward in the state that the lower portion of the lid is open, the projection portion can move over the protrusion portion that stops the projection portion, and the lid can be thereby removed from the instrument panel.

With this structure, as the projection portion is formed on the lid, projecting to the rear surface side of the margin of the opening portion, the lid can be supported on the rear surface side of the instrument panel. On the other hand, removing the lid, it is necessary to once move down the lid until the projection portion of the lid stops by engagement at the protrusion portion in a state that the lid is open, and further it is necessary that the projection portion formed on the lid moves over the protrusion portion of the margin of the opening portion where the projection portion formed on the lid stops by engagement.

Accordingly, even when the lid is unintentionally kicked, as the projection portion formed on the lid stops by engagement at the protrusion portion, and the lid does not move down any more, it does not occur that the lid easily separates from the instrument panel to drop off.

Further, the vehicle instrument panel structure is preferably arranged such that the projecting portion of the lid is provided with a contact-engaged portion that stops at the protrusion portion by engagement, and that the rear surface side of the margin of the opening portion of the instrument panel is provided with: a support portion for supporting the contact-engaged portion when the lid is open; an extension portion continuously extending downward from the support portion; and the protrusion portion that is protruding from a part of the extension portion.

With such a structure, as the contact-engaged portion formed on the lid is engaged in contact with the support portion formed on the rear surface side of the instrument panel, the lid can be supported by the instrument panel.

Further, as the extension portion is provided, continuously extending from the support portion, when the lid in an open state is moved downward, the contact-engaged portion engaged in contact with the support portion slides along the extension portion, and the lid can thereby be removed.

On the other hand, as the protrusion portion is formed on the extension portion where the contact-engaged portion slides, the contact-engaged portion stops by engagement at the protrusion portion, and the lid cannot be separated from the instrument panel unless the contact-engaged portion moves over the protrusion portion at which the contact-engaged portion is engaged in contact.

That is, with such a structure, not only it is necessary to move down the lid in a state that the contact-engaged portion is engaged in contact with the support portion, but also it is necessary to draw down the lid in a state that the contact-engaged portion is stopped by engagement at the protrusion portion.

Accordingly, even when the lid moves downward by mistake, such as unintentional kicking of the lid, the contact-engaged portion of the lid is stopped by engagement by the protrusion portion, and as the lid is not separated unless the lid is moved downward again, it does not occur that the lid drops off from the instrument panel.

Still further, the vehicle instrument panel structure is preferably arranged such that the protrusion portion is formed in a vicinity of the support portion.

With such a structure, as the protrusion portion is formed in a vicinity of the support portion at which the contact-engaged portion is engaged in contact, the contact-engaged portion continues to be engaged in contact at the support portion unless the contact-engaged portion moves over the protrusion portion. The lid can thereby be stably supported.

Yet further, the vehicle instrument panel structure is preferably arranged such that an auxiliary panel for covering the margin of the opening portion is fitted on the instrument panel, and a gap between the protrusion portion and the auxiliary panel is set in a size that enables sandwiching the contact-engaged portion.

With such a structure, as the gap between the protrusion portion and the auxiliary panel is set in a size that enables sandwiching the contact-engaged portion, even when the lid rises up, as the lid contacts the auxiliary panel covering the margin of the opening portion, it does not occur that the lid moves over the protrusion portion.

Advantage of the Invention

As has been described above, according to the present invention, it is possible to provide a vehicle instrument panel structure where a lid can be easily removed from an instrument panel while the lid hardly drops off.

BRIEF DESCRIPTION OF THE DRAWINGS

FIG. 1 (*a*) is a front view of an instrument panel fitted on a vehicle in an embodiment, taken from the inside of a vehicle;

FIG. 1(*b*) is an enlarged view in the region enclosed by a dashed curve in FIG. 1 (*a*);

FIG. 2 is a diagram, in a front view, of a state that the lid is removed from the instrument panel in the embodiment;

FIG. 4 (*b*) is a view of the instrument panel shown in FIG. 3, taken along B-B and in the arrowed direction;

FIG. 6 (*a*) is a cross-sectional view showing the cross-section on the right side of a marginal portion of an instrument panel in a second embodiment; and FIG. 6 (*b*) is a cross-sectional view showing the cross-section of the central portion of the marginal portion of the instrument panel in the second embodiment.

EMBODIMENTS FOR CARRYING OUT THE INVENTION

First Embodiment

Figure 3:
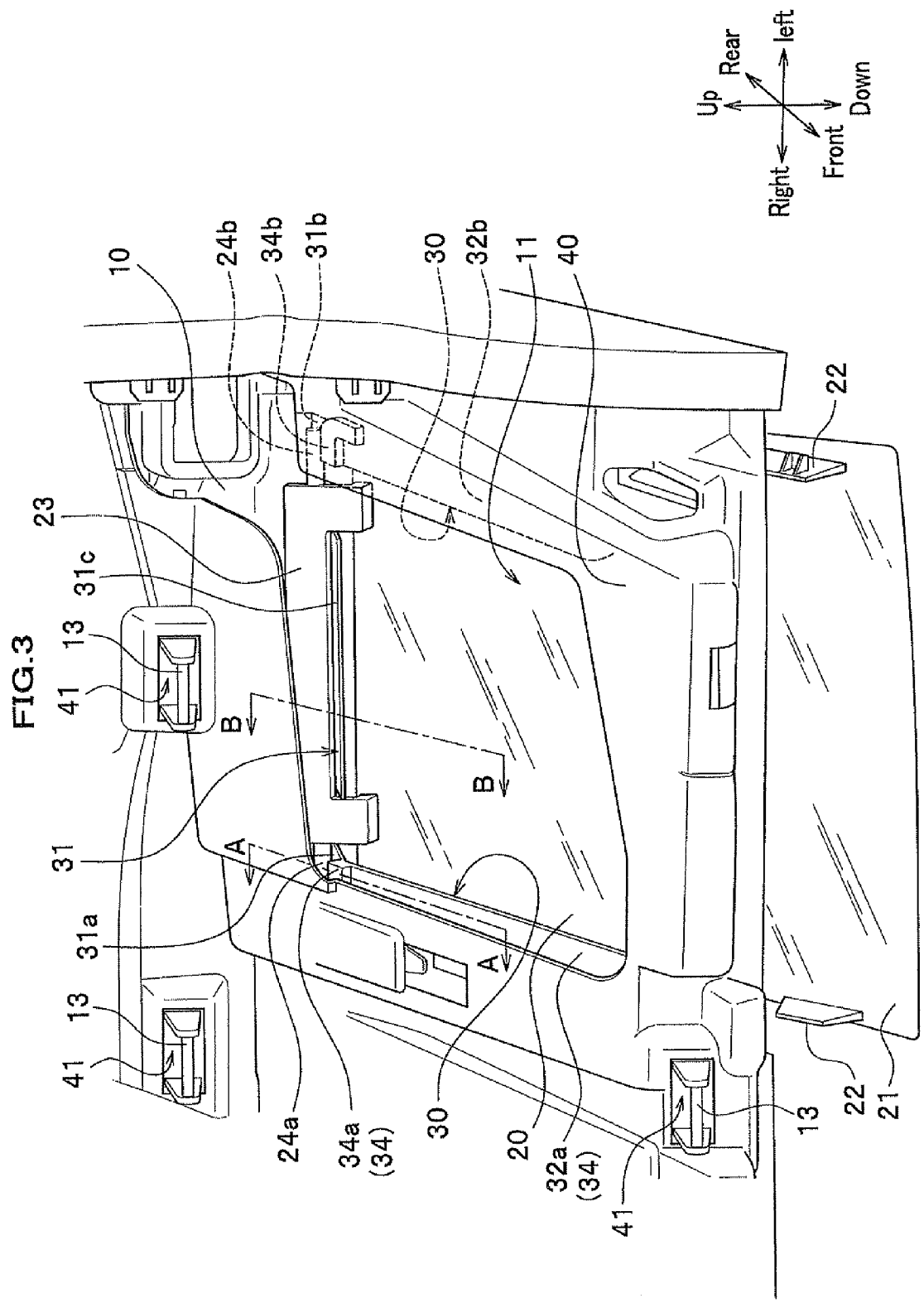
FIG. 3 is a rear view of the instrument panel in the embodiment, taken from the rear surface side.

An instrument panel structure for a vehicle in a first embodiment according to the present invention will be described below, referring to the drawings. The same symbols will be assigned to the same elements.

The instrument panel structure for a vehicle 1 in the present embodiment includes three members, namely, an instrument panel 10 as a main body, a lid 20 fitted on the instrument panel 10, and an auxiliary panel 40.

(Instrument Panel 10)

The instrument panel 10 is a panel for supporting various meters, switches, audios, and the like, and is fitted to the vehicle body of a vehicle 1 such that various supported meters, switches, and the like face the inner side of a vehicle interior 2, as shown in FIG. 1 (*a*). Further, as shown in FIG. 1 (*a*), the instrument panel 10 is provided with an opening portion 11 on the left-lower side, and a lid 20 for closing the opening portion 11 is fitted.

The opening portion 11 is a hole for replacement task on a fuse, not shown, fitted on the rear surface side of the instrument panel 10. As shown in FIGS. 1 and 2, the opening portion 11 is provided on the lower surface 10*a* of the instrument panel 10. As shown in FIGS. 1 (*b*) and 2, the lower surface 10*a* is inclined such as to be closer to the vehicle front side as going downward. Accordingly, accompanying the lower surface 10*a*, the opening portion 11 is also an inclined hole such that the lower side is closer to the vehicle front side than the upper side. Further, the opening portion 11 is formed in a size that enables replacement of a fuse. The rear surface side of the instrument panel 10 refers to the vehicle body side where the instrument panel 10 is fitted, and the front surface side of the instrument panel 10 refers to the side facing the vehicle interior 2.

Furthermore, the instrument panel 10 is, as shown in FIG. 3, provided on the rear surface side with a marginal portion 30 for removably supporting the lid 20, and is provided on the rear surface side of the instrument panel 10 with an auxiliary panel 40.

The lid 20, the marginal portion 30, and the auxiliary panel 40 will be described below in detail.

(Lid 20)

The lid 20 is a lid member that is removably supported by the marginal portion 30 of the instrument panel 10, and closes the opening portion 11. The lid 20 has, as shown in FIG. 2, a closing portion 21 for closing the opening portion 11, engagement portions 22 formed on the rear surface of the closing portion 21, and a projection portion 23 projecting from the upper side of the closing portion 21.

The closing portion 21 is, as shown in FIG. 2, in a plate shape corresponding to the size of the opening portion 11 that is closed, and is formed such as to be on the same plane as the front surface side of the instrument panel 10.

Further, as shown in FIG. 2, the engagement portions 22 are used for engagement, being engaged into the engagement holes 33 of the later-described marginal portion 3, in order that the closing portion 21 holds the opening portion 11 in a closed state. The engagement portions 22 are formed on the rear surface side of the closing portion 21 at positions corresponding to the engagement holes 33 of the marginal portion 30.

The projection portion 23 is a portion that is supported by the marginal portion 30 formed on the rear surface of the instrument panel 10, and projects upward from the rear surface side of the closing portion 21. Concretely, the projection portion 23 is, as shown in FIG. 2, includes a contact-engaged portion 24 projecting along the lateral direction of the closing portion 21 and connection portions 25 for connecting the contact-engaged portion 24 and the closing portion 21.

Figure 4:
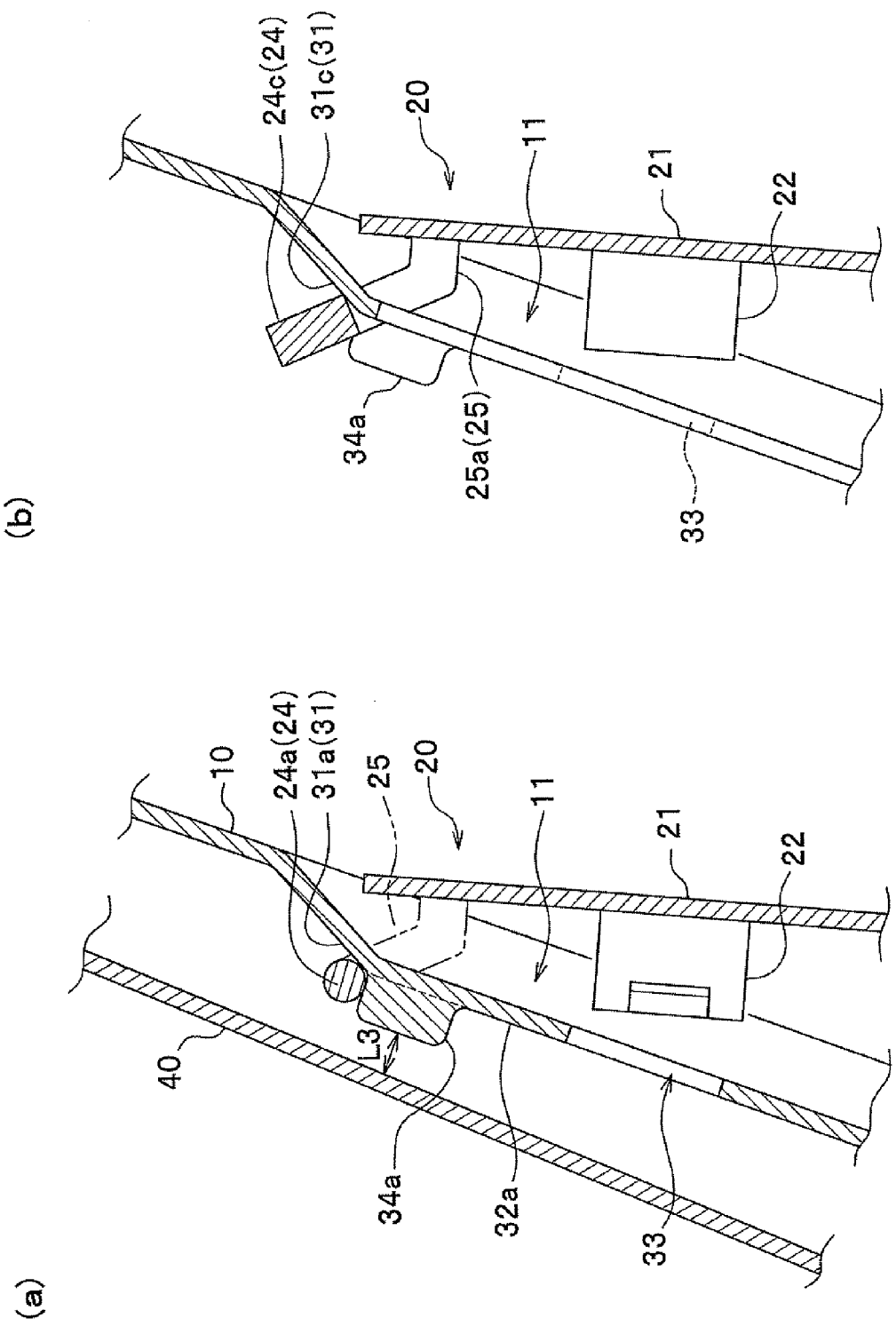
FIG. 4 (*a*) is a view of the instrument panel shown in FIG. 3, taken along A-A and in the arrowed direction.

The connection portions 25 extend from the rear surface upper portion of the closing portion 21 to the rear surface side and further extend from there, and are formed substantially in an L-shape in a side view (refer to FIG. 4 (a) and FIG. 4 (b)). Further, as shown in FIG. 2, when the lid 20 is viewed from the front side, the connection portions 25 include, a right side connection portion 25a disposed on the right side and a left side connection portion 25b disposed on the left side.

As shown in FIG. 2, when viewed from the front surface side of the closing portion 21, the contact-engaged portion 24 includes a right side contact-engaged portion 24a projecting from the right side surface of the right side connection portion 25a, a left side contact-engaged portion 24b projecting from the left side surface of the left side connection portion 25b, and a central contact-engaged portion 24c extending between the right side connection portion 25a and the left side connection portion 25b, along the lateral direction of the closing portion 21.

Further, as shown in FIG. 2, the length L1 from the end portion of the right side contact-engaged portion 24a to the end portion of the left side contact-engaged portion 24b is formed to be longer than the distance L2 between a right side support portion 31a and a left side support portion 31b of a support portion 31 of the marginal portion 30 described later. The distance between the right side support portion 31a and the left side support portion 31b of the support portion 31 and the distance between a right side extension portion 32a and a left side extension portion 32b of an extension portion 32 are formed to be the same, which will be described later. Further, 'L2' shown in FIG. 2 represents the distance between the right side extension portion 32a of the extension portion 32 and the left side extension portion 32b.

The right side contact-engaged portion 24a and the left side contact-engaged portion 24b are formed in a shape with which the right side contact-engaged portion 24a and the left side contact-engaged portion 24b can be stopped by engagement in contact with a protrusion portion 34 of the marginal portion 30, described later, and can slide on and move over the protrusion portion 34 in contact when the lid 20 is moved downward. The right side contact-engaged portion 24a and the left side contact-engaged portion 24b are formed in, for example, in a shape of a cylinder, a chamfered triangular prism, or the like.

Further, the right side contact-engaged portion 24a and the left side contact-engaged portion 24b are formed such as to have a thickness that is a little larger than the gap L3 (refer to FIG. 4) formed by the later-described protrusion portion 34 of the marginal portion 30 and the auxiliary panel 40.

As shown in FIG. 3 and FIG. 4 (b), the central contact-engaged portion 24c is engaged in contact with a central support portion 31c of the support portion 31 described later, and is formed longer than the central support portion 31 with respect to the lateral direction. As neither the central contact-engaged portion 24c or the corresponding central support portion 31c is not an element that contributes to the structure, according to the present invention, of preventing drop-off of the lid 20, the shape and the like thereof is not particularly limited, however, with this arrangement, the lid 20 can be supported in a more stable state when the lid 20 is opened.

(Marginal Portion 30)

The marginal portion 30 is, as shown in FIG. 3, an element that removably supports the lid 20 for closing the opening portion 11, and is formed, on the rear surface side of the instrument panel 10, in the margin of the upper end side and in the margins of the left/right sides of the opening portion 11.

The marginal portion 30 is, as shown in FIG. 3 and FIG. 4 (a), includes the support portion 31 for supporting the contact-engaged portion 24 of the lid 20, the extension portion 32 extending from the support portion 31 to the rear surface lower side, the engagement holes 33 penetrating the extension portion 32, and the protrusion portion 34 protruding from the extension portion 32 toward the rear surface upper side.

The support portion 31 is a component for supporting the contact-engaged portion 24 formed at the projection portion 23 of the lid 20. As shown in FIG. 3, corresponding to the right side contact-engaged portion 24a, the left side contact-engaged portion 24b, and the central contact-engaged portion 24c of the contact-engaged portion 24 of the lid 20, the support portion 31 includes the right side support portion 31a disposed on the right side, the left side support portion 31b disposed on the left side, and the central support portion 31c disposed at the center.

The right side support portion 31a is, as shown in FIG. 4 (a), extending from the upper end side of the opening portion 11 of the instrument panel 10 toward the vehicle front side and downward. The inclination angle of the right side support portion 31a is, as shown in FIG. 4 (a), formed to an extent at which the right side contact-engaged portion 24a engaged in contact with the right side support portion 31a can slide to the right side extension portion 32a side by the own-weight of the lid 20. The contact-engaged portion 24 of the lid 20 can thereby be engaged in contact with the support portion 31, and slides toward the right side extension portion 32a side by the own-weight of the lid 20.

Further, similarly to the right side support portion 31a, the left side support portion 31b is also extending from the upper end side of the opening portion 11 of the instrument panel 10 toward the vehicle front side, with an angular inclination.

The width L2, which is the distance between the right side support portion 31a and the left side support portion 31b, is formed smaller than the length L1 between the end portion of the right side contact-engaged portion 24a and the end portion of the left side contact-engaged portion 24b.

Thus, the right side contact-engaged portion 24a and the left side contact-engaged portion 24b on the both end sides of the contact-engaged portion 24 can be engaged in contact respectively with the right side support portion 31a and the left side support portion 31b, wherein the both end sides of the lid 20 are supported by the support portion 31.

The central support portion 31c is, as shown in FIG. 4 (b), extending from the upper end side of the opening portion 11 toward the rear surface side to an extent that the central support portion 31c can support the central contact-engaged portion 24c of the contact-engaged portion 24. Further, the central support portion 31c is formed, as shown in FIG. 3, shorter than the width of the central contact-engaged portion 24c.

Still further, the support portion 31 is provided with respective notches between the right side support portion 31a, the central support portion 31c, and the left side support portion 31b, wherein the connection portion 25 of the projection portion 23 of the lid 20 can pass the notches. The connection portion 25 of the projection portion 23 of the lid 20 can pass the notches between the right side support portion 31a, the central support portion 31c, and the left side support portion 31b so that the contact-engaged portion 24 on the upper side of the projection portion 23 can be disposed upper than the support portion 31.

The extension portion 32 is a portion for preventing drop-off of the lid 20 from the instrument panel 10 even in a case that the contact-engaged portion 24 of the lid 20 deviates from the support portion 31 to the rear surface side to lose support.

The extension portion 32, as shown in FIGS. 2 and 3, includes the right side extension portion 32a (refer to FIG. 4 (a)) extending from the rear surface side end portion of the right side support portion 31a of the support portion 31 toward the rear surface lower side, and the left side extension portion 32b extending from the rear surface end portion of the left side support portion 31b toward the rear surface lower side.

The distance between the right side extension portion 32a and the left side extension portion 32b is formed to be the same length as the distance L2 between the right side support portion 31a and the left side support portion 31b of the support portion 31.

Thus, even when the lid 20 has moved downward in parallel, the right side contact-engaged portion 24a and the left side contact-engaged portion 24b of the lid 20 are engaged in contact with the extension portion 32, and the lid 20 thereby is prevented from dropping-off from the instrument panel 10.

By rotating the lid 20 in a state that the right side contact-engaged portion 24a and the left side contact-engaged portion 24b are engaged in contact with the right side extension portion 32a and the left side extension portion 32b, the right side contact-engaged portion 24a and the left side contact-engaged portion 24b stop the engagement so that the lid 20 can be removed from the instrument panel 10.

The engagement holes 33 are, as shown in FIG. 2 and FIG. 4 (a), holes that the extension portion 32 penetrates, and are formed in a shape that enables engagement stop of the engagement portions 22 of the lid 20 by engaging of the engagement portions 22 into the engagement holes 33. Further, the engagement holes 33 are formed at positions that correspond to the engagement portions 22 formed on the rear surface side of the lid 20 when the opening portion 11 of the lid 20 is closed.

The protrusion portion 34 includes, as shown in FIG. 3, a right side protrusion portion 34a formed by protrusion of the upper surface side of the right side extension portion 32a in the vicinity of the right side support portion 31a, and a left side protrusion portion 34b formed by protrusion of the upper surface side of the left side extension portion 32b in the vicinity of the left side support portion 31b.

Herein, the right side protrusion portion 34a is, as shown in FIG. 4 (a), formed in the vicinity of the right side support portion 31a. Accordingly, as shown in FIG. 4 (a), the contact-engaged portion 24a sliding along the right side support portion 31a, which is an inclined surface, to the right side extension portion 32a side comes in contact with the upper surface side of the right side protrusion portion 34a and stops by engagement.

Figure 5:
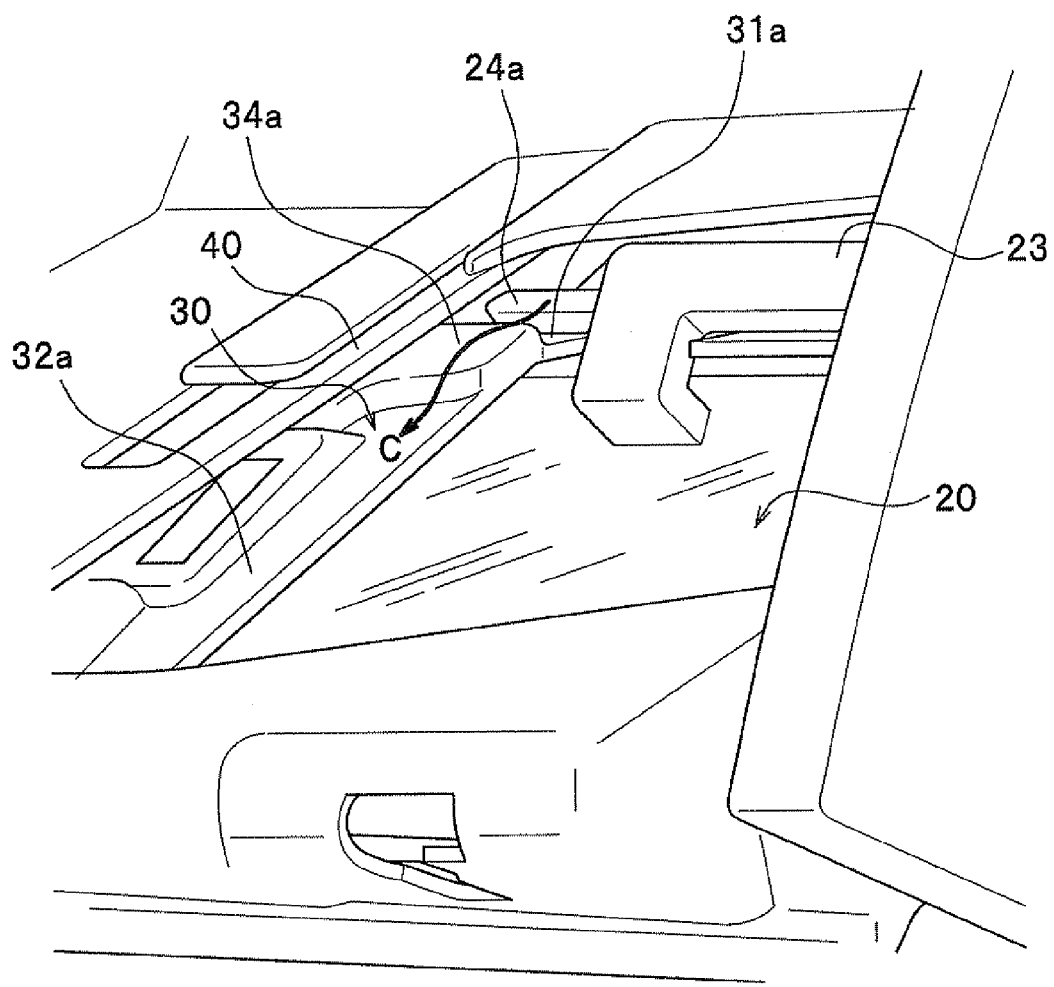
FIG. 5 is an enlarged view of a marginal portion formed on the rear surface side of the instrument panel in the embodiment and a lid supported by the marginal portion.

Further, the right side protrusion portion 34a is, as shown in FIG. 4 (a), formed in a shape with which the right side contact-engaged portion 24a can slide along and move over the right side protrusion portion 34a in contact when the lid 20 is moved downward. The right side protrusion portion 34a in the present embodiment is, as shown in FIG. 5, protruding in a chamfered rectangular shape, however without being limited thereto, may be, for example, a protrusion in a half cylindrical shape.

Further, though not shown, similarly to the right side protrusion portion 34a, the left side protrusion portion 34b is formed in the vicinity of the left side support portion 31b, and is also formed in a shape with which the left side contact-engaged portion 24b can slide along and move over the left side protrusion portion 34b when the lid 20 is moved downward.

Still further, the side surfaces on the lower sides of the right side protrusion portion 34a and the left side protrusion portion 34b are formed to be gradually inclined surfaces with respect to the surface of the extension portion 32.

(Auxiliary Panel 40)

An auxiliary panel 40 will be described below. The auxiliary panel 40 is, as shown in FIG. 3, provided with a fitting hole 41 and can be fitted to the rear surface side of the instrument panel 10 by inserting the fitting member 13 formed on the rear surface side of the instrument panel 10 into the fitting hole 41.

The auxiliary panel 40 is formed, as shown in FIG. 4 (a), such that a gap L3 between the auxiliary panel 40 and the protrusion portion 34 of the marginal portion 30 is a little smaller than the thickness of the contact-engaged portion 24 of the lid 20.

With the above-described instrument panel structure for a vehicle in the present embodiment, by drawing the lower side of the lid 20 for closing the opening portion 11 of the instrument panel 10 toward the front surface side, the opening portion 11 can be made into an open state.

Further, the support portion 31 of the marginal portion 30, the contact-engaged portion 24 of the lid 20 being engaged in contact with the support portion 31, is formed such as to have inclination with which the contact-engaged portion 24 can slide to the extension portion 32a side by the own weight of the lid 20. Thereby, the contact-engaged portion 24 slides along the support portion 31 to the extension portion 32 side, and stops by engagement with the protrusion portion 34. Accordingly, as shown in FIG. 4 (a), when the lid 20 is open, the contact-engaged portion 24 of the lid 20 comes in contact with the protrusion portion 34 and stops by engagement.

In case of removing the lid 20 from the instrument panel 10, the lid 20 is drawn downward. Herein, the protrusion portion 34 where the contact-engaged portion 24 stops by engagement is formed in a shape with which the contact-engaged portion 24 in contact can slide along and move over the protrusion portion 34 when the lid 20 is drawn downward. Accordingly, the contact-engaged portion 24 of the lid 20 moves to the extension portion 32 side, moving over the protrusion portion 34, as shown in FIG. 5 by arrow C direction.

Further, as the distance L3 between the protrusion portion 34 and the auxiliary panel 40 is, as shown in FIG. 4 (a), set smaller than the thickness of the contact-engaged portion 24, when the contact-engaged portion 24 moves over the protrusion portion 34, the contact-engaged portion 24 moves to the extension portion 32 side, while sliding on the two surfaces of the protrusion portion 34 and the auxiliary panel 40.

Then, by rotating the lid 20, the contact-engaged portion 24 stops being engaged in contact with the extension portion 32, and the lid 20 can be removed from the instrument panel 10.

Further, in order to fit the lid 20, the contact-engaged portion 24 of the lid 20 is made engaged in contact with extension portion 32 of the marginal portion 30, and is drawn upward. In this occasion, as the side surfaces of the lower sides of the right side protrusion portion 34a and the left side protrusion portion 34b, which are in contact with the right side protrusion portion 34a and the left side protrusion portion 34b, are inclined, the contact-engaged portion 24 of the lid 20 can slide without stopping by engagement, move over the protrusion portion 34, and get engaged in contact with the support portion 31.

It may occur that a passenger kicks by mistake the lid 20 in a state that the opening portion 11 is closed, or a worker unintentionally contacts the lid 20 in a state that the opening portion 11 is open and the lid 20 is supported by the support portion 31 such as to be stopped by engagement with the protrusion portion 34 of the marginal portion 30.

Even in such a case, according to the instrument panel 10 in the present embodiment, as the contact-engaged portion 24 of the lid 20 is engaged in contact with the protrusion portion 34 formed on the extension portion 32, the contact-engaged portion 24 does not linearly move toward the extension portion 32 side.

Further, even when the contact-engaged portion 24 of the lid 20 moves along and over the surface of the protrusion portion 34 and moves to the extension portion 32 side, as the gap L3 between the protrusion portion 34 and the auxiliary panel 40 is formed to be a little smaller than the thickness of the contact-engaged portion 24 of the lid 20, the contact-engaged portion 24 of the lid 20 is sandwiched by the gap between the protrusion portion 34 and the auxiliary panel 40.

Further, likewise, even when the lid 20 is moved upper than the protrusion portion 34 by the above-described contact, as the gap L3 between the protrusion portion 34 and the auxiliary panel 40 is formed a little smaller than the thickness of the contact-engaged portion 24 of the lid 20, as shown in FIG. 4 (a), the contact-engaged portion 24 of the lid 20 does not move over the protrusion portion 34 without contacting the protrusion portion 34.

Therefore, with the instrument panel 10 in the present embodiment, as it does not occur that the contact-engaged portion 24 of the lid 20 moves to the extension portion 32 side by contact or the like and that the lid 20 rotates, the lid 20 does not easily drop off.

Further, regarding removing the lid 20, the lid 20 can be easily removed by simple operations of opening the lower portion of the lid 20 and drawing downward and rotating the lid 20.

Still further, with the instrument panel structure for a vehicle in the present embodiment, it is only necessary to form the margins of the opening portion 11 of the instrument panel 10 and the lid 20 in the above-described shapes, there is no problem that additional members are necessary and the cost increases.

The instrument panel structure for a vehicle in the foregoing embodiment has been described above, however, the invention is not limited to the instrument panel structure for a vehicle in the foregoing embodiment.

For example, the protrusion portion 34 of the marginal portion 30 in the foregoing embodiment has both the right side protrusion portion 34a and the left side protrusion portion 34b, however, only either one may be employed. This is because, even when the protrusion portion 34 includes only the right side protrusion portion 34a formed on the right side extension portion 32a, the contact-engaged portion 24 of the lid 20 can come in contact with the right side protrusion portion 34a and be stopped by engagement.

Second Embodiment

An instrument panel structure for a vehicle in a second embodiment according to the present invention will be described below, referring to the drawings.

The instrument panel structure for a vehicle in the second embodiment includes an instrument panel 10b, a lid 20, and an auxiliary panel 40, and is different from the instrument panel structure for a vehicle in the first embodiment in that the instrument panel structure for a vehicle in the second embodiment includes the instrument panel 10b.

More concretely, the difference between the instrument panel 10b in the second embodiment and the instrument panel 10 in the first embodiment is that a marginal portion 30a, of the instrument panel 10b, disposed on the rear surface side includes a support portion 131 in the second embodiment, while the marginal portion 30 of the instrument panel 10 includes the support portion 31 in the first embodiment.

In the following, the instrument panel structure for a vehicle in the second embodiment will be described only on the support portion 131, which is the difference from the first embodiment, and description of the same elements as those in the first embodiment will be omitted.

The support portion 131 of the marginal portion 30a includes a right side support portion 131a, a left side support portion 131b, and a central support portion 131c, corresponding to a right side contact-engaged portion 24a, a left side contact-engaged portion 24b, and a central contact-engaged portion 24c of a contact-engaged portion 24 of the lid 20.

The right side support portion 131a, as shown in FIG. 6(a), extends from the upper end side of an opening portion 11 of the instrument panel 10b toward the vehicle front side, while inclining downward.

Further, the inclination angle of the right side support portion 131a is, as shown in FIG. 6 (a), an angle with which the right side contact-engaged portion 24a can be supported, and also an angle that enables directing the right side contact-engaged portion 24a to the extension portion 32 side when the lid 20 is moved downward in a state that the right side contact-engaged portion 24a is supported. Further, a left side support portion, not shown, and the central support portion 131, shown in FIG. 6 (b), are also formed similarly to the right side support portion 131a.

With the above-described instrument panel structure for a vehicle in the second embodiment, when the lower side of the lid 20 for closing the opening portion 11 of the instrument panel 10b is drawn to the front surface side, the contact-engaged portion 24 of the lid 20 gets supported in a state of engagement in contact with the support portion 131 of the marginal portion 30a of the instrument panel 10.

Further, when the lid 20 is moved down toward the lower side in order to remove the lid 20, the contact-engaged portion 24 of the lid 20 slides to the right side extension portion 32 side, along the support portion 131 inclined to the extension portion 32 side, and comes in contact with the protrusion portion 34 to stop by engagement.

Then, when the lid 20 is further moved downward, the contact-engaged portion 24 slides on and move over the protrusion portion 34 to the extension portion 32 side.

Further, as shown in FIG. 6 (a), as the distance L3 between the protrusion portion 34 and the auxiliary panel 40 is set smaller than the thickness of the contact-engaged portion 24, when the contact-engaged portion 24 moves over the protrusion portion 34, the contact-engaged portion 24 moves to the extension portion 32 side while sliding on the two surfaces of the protrusion portion 34 and the auxiliary panel 40.

As has been described above, according to the second embodiment, even when a passenger unintentionally kicks the lid 20, and the contact-engaged portion 24 of the lid 20, as shown in FIG. 6(a), linearly moves toward the extension portion 32 side, the contact-engaged portion 24 does not move to the extension portion 32 side because the protrusion portion 34 is formed and the contact-engaged portion 24 comes in contact with the protrusion portion 34 and stops by engagement.

Further, even when the contact-engaged portion 24 of the lid 20 moves along and over the surface of the protrusion portion 34 to the extension portion 32 side, the contact-engaged portion 24 is sandwiched by the gap between the protrusion portion 34 and the auxiliary panel 40 as the gap L3 between the protrusion portion 34 and the auxiliary panel 40 is set a little smaller than the thickness of the contact-engaged portion 24 of the lid 20.

In such a manner, also with the instrument panel 10b in the second embodiment, it does not occur that the contact-engaged portion 24 of the lid 20 moves to the extension portion 32 side and the lid 20 rotates, and the lid 20 accordingly does not easily drop off. Thus, it is possible to provide an instrument panel structure, for a vehicle, where a lid hardly drops-off.

REFERENCE SYMBOLS

1 . . . vehicle
2 . . . vehicle interior
10, 10b . . . instrument panel
11 . . . opening portion
20 . . . lid
21 . . . closing portion
22 . . . engagement portion
23 . . . projection portion
24, 24a-24c . . . contact-engaged portion
25, 25a, 25b . . . connection portion
30, 30a . . . marginal portion
31, 31a-31c, 131, 131a, 131c . . . support portion
32, 32a, 32b . . . extension portion
33 . . . engagement hole
34, 34a, 34b . . . protrusion portion
40 . . . auxiliary panel
41 . . . fitting hole

The invention claimed is:

1. A vehicle instrument panel structure having an opening portion for maintenance of components disposed inside an instrument panel for a vehicle and a lid covering the opening portion, the vehicle instrument panel structure comprising:
a projection portion projecting from an upper portion of the lid to a surface side of a margin of the opening portion facing inwardly of the instrument panel; and
a protrusion portion at which the projection portion of the lid stops by engagement in a state that a lower portion of the lid is open, the protrusion portion being formed on the surface side of the margin of the opening portion facing inwardly of the instrument panel,
wherein the protrusion portion projects inwardly of the instrument panel and the projection portion can be moved over and downwardly of the protrusion portion by moving the projection portion inwardly of the instrument panel and then downwardly.

2. The vehicle instrument panel structure according to claim 1,
wherein the projecting portion of the lid is provided with a contact-engaged portion that stops at the protrusion portion by engagement,
and wherein the rear surface side of the margin of the opening portion of the instrument panel is provided with:
a support portion for supporting thereon the contact-engaged portion which engages therewith when the lid is open;
an extension portion continuously extending downward from the support portion; and
the protrusion portion that is protruding from a part of the extension portion.

3. The vehicle instrument panel structure according to claim 2, wherein the protrusion portion is formed in a vicinity of the support portion.

4. The vehicle instrument panel structure according to claim 3,
wherein an auxiliary panel for covering the margin of the opening portion is fitted on the instrument panel,
and wherein a gap between the protrusion portion and the auxiliary panel is set in a size that enables sandwiching the contact-engaged portion, but which permits the contact-engaged portion to be forcibly drawn therethrough.

5. The vehicle instrument panel structure according to claim 2,
wherein an auxiliary panel for covering the margin of the opening portion is fitted on the instrument panel,
and wherein a gap between the protrusion portion and the auxiliary panel is set in a size that enables sandwiching the contact-engaged portion, but which permits the contact-engaged portion to be forcibly drawn therethrough.

6. The vehicle instrument panel structure according to claim 1, wherein the protrusion portion projects toward a front of the vehicle.

7. The vehicle instrument panel structure according to claim 1, wherein the projection portion can be moved over and downwardly of the protrusion portion by moving the projection portion inwardly of the instrument panel and then downwardly through a space more inwardly of the instrument panel than the protrusion portion.

8. The vehicle instrument panel structure according to claim 1, wherein after the projection portion is moved over and downwardly of the protrusion portion the lid may be rotated relative to the opening portion for being removed from the instrument panel.

* * * * *